US006705150B1

(12) United States Patent
Jellá

(10) Patent No.: US 6,705,150 B1

(45) Date of Patent: Mar. 16, 2004

(54) METHOD OF MAKING A RAISED PANEL DOOR SECTION FOR A GARAGE DOOR

(75) Inventor: John F. Jellá, Tempe, AZ (US)

(73) Assignee: 1st United Door Technologies, Inc., Tempe, AZ (US)

( * ) Notice: Subject to any disclaimer, the term of this patent is extended or adjusted under 35 U.S.C. 154(b) by 0 days.

(21) Appl. No.: 10/310,755

(22) Filed: Dec. 4, 2002

Related U.S. Application Data

(62) Division of application No. 09/792,544, filed on Feb. 22, 2001, now Pat. No. 6,554,048.

(51) Int. Cl.[7] ........................ B21D 22/00; B21D 11/04; B23P 21/00; E06B 3/48

(52) U.S. Cl. ............................ 72/446; 72/304; 72/312; 72/351; 72/378; 72/448; 29/430; 29/469.5; 160/229.1

(58) Field of Search .......................... 72/304, 312, 296, 72/297, 351, 378, 379, 446, 448; 29/897.32, 469.5, 458, 430; 160/229.1, 232

(56) References Cited

U.S. PATENT DOCUMENTS

| | | | | |
|---|---|---|---|---|
| 2,485,354 A | * 10/1949 | Brennan | ...................... | 72/352 |
| 3,967,671 A | 7/1976 | Stanley et al. | | |
| 3,990,288 A | * 11/1976 | Mackenzie | ................... | 72/296 |
| 4,211,102 A | * 7/1980 | Hurvitz | ....................... | 72/304 |
| 4,284,119 A | 8/1981 | Martin et al. | | |
| 4,492,067 A | 1/1985 | Martin et al. | | |
| 4,518,026 A | 5/1985 | Otto et al. | | |
| 5,016,700 A | 5/1991 | Wegner et al. | | |
| 5,060,711 A | * 10/1991 | Fimbell, III | ............. | 160/229.1 |
| 5,177,868 A | * 1/1993 | Kyle et al. | ............... | 29/897.32 |
| 5,509,457 A | 4/1996 | Jella | | |
| 5,555,923 A | 9/1996 | Leist et al. | | |
| 5,737,802 A | 4/1998 | Jella | | |
| 6,067,699 A | * 5/2000 | Jackson | ....................... | 29/430 |
| 6,554,048 B1 | * 4/2003 | Jella | ........................ | 160/229.1 |

* cited by examiner

*Primary Examiner*—David Jones

(74) *Attorney, Agent, or Firm*—Jordan M. Meschkow; Lowell W. Gresham; Meschkow & Gresham, PLC

(57) ABSTRACT

A raised panel door section (22, 54, 64) for an overhead garage door (20, 50, 60) includes a sheet metal layer (32, 56, 66) formed from sheet metal stock (74) that is embossed to produce a raised panel design by an automated method that selects one of a first die set (84) and a second die set (90) in response to a predetermined embossment style, installs the selected one of the first and second die sets (84, 90) into an embossing press (36) and embosses the sheet metal stock (74) with the predetermined embossment style. The predetermined embossment style includes one of a vertical raised panel design (30), a horizontal raised panel design (52), and a horizontal long raised panel design (62).

6 Claims, 7 Drawing Sheets

72

36

METHOD OF MAKING A RAISED PANEL DOOR SECTION FOR A GARAGE DOOR

RELATED APPLICATIONS

This application is a divisional application of U.S. patent application Ser. No. 09/792,544, filed on Feb. 22, 2001, now U.S. Pat. No. 6,554,048.

TECHNICAL FIELD OF THE INVENTION

The present invention relates to the field of garage doors. More specifically, the present invention relates to raised panel door sections for overhead garage doors.

BACKGROUND OF THE INVENTION

A typical overhead garage door is constructed from a plurality of door sections, which are hinged together and supported from a track system with rollers attached to opposite ends of the door sections. The rollers generally allow the door to be moved from a vertically oriented closed position to a substantially horizontal open position. Electrically powered garage door openers are often used with the overhead garage door so that a driver may conveniently open and close the door from within a vehicle.

With regard to residential applications, an overhead garage door is generally either eight or sixteen feet wide. Typically, such a door includes four horizontally oriented door sections, each of which is about eight or sixteen feet wide and twenty-one inches high. For example, a single car residential garage may have an eight foot wide by seven foot high door. Likewise, a two car residential garage may have a single sixteen foot wide door by seven foot high door or two eight foot wide by seven foot high doors.

The earliest overhead garage doors were fabricated from wood. Unfortunately, wood overhead garage doors are costly to maintain. For example, the wood is adversely affected by the elements. Specifically, the sun, rain, snow, varying temperatures, and so forth will degrade the finish of the wood and eventually cause the wood to warp, split, or rot. Consequently, a wood overhead garage door should be re-sealed or re-painted every couple of years to maintain the aesthetic appearance and integrity of the wood overhead garage door. This labor intensive and costly maintenance is highly undesirable to the typical homeowner.

In addition, insects, such as termites and carpenter ants, frequently attack the wood causing significant damage. Accordingly, the use of a wood overhead garage door necessitates frequent inspections and treatment for insect damage. Again, this is a highly undesirable situation to the homeowner in terms of labor and cost. For these reasons, traditional wood overhead garage doors are declining in popularity, and homeowners are opting for longer-lasting, low-maintenance doors made of steel or plastic.

Like the wood overhead garage doors, steel overhead garage doors are constructed from a plurality of door sections. However, the door sections are made of sheet metal typically embossed to give it a wood grain appearance. The embossed sheet metal is then either stamped with a raised panel design or made directly into flush door sections. The sheet metal door section may be uninsulated. Alternatively, a layer of insulation may be added inside the frame of the sheet metal door section with or without a sheet metal layer on the interior of the door to protect the insulation and add strength to the door section. Because the steel overhead garage doors are made of sheet metal that has been galvanized, primed, and painted with at least one coat of finish paint, they require very little maintenance.

Unfortunately, some steel overhead garage doors suffer from problems associated with insufficient rigidity. In particular, over time a steel overhead garage door may bow or warp along a longitudinal dimension, i.e., width, of the door section. If enough bowing occurs, the sheet metal layer may begin to tear, the rollers of the door section may begin to repeatedly fall out of the door tracks, or the hardware components, such as the rollers, connection points, springs, or the tracks could fail causing property damage and/or injury.

In addition to possible mechanical problems associated with a traditional steel overhead garage door, the steel overhead garage door also suffers from problems associated with aesthetic appearance. For example, traditional seven foot high raised panel doors typically have a horizontally oriented, rectangular raised panel design stamped on four twenty-one inch door sections. As steel overhead garage doors have flooded the industry, a need has arisen for a deviation from existing garage door designs. That is, garage door manufacturers, architects, builders, and homeowners desire a garage door that looks different from the traditional raised panel steel garage doors inundating the market. However, in order to gain acceptance in the industry, a steel garage door cannot simply be different in appearance, it should also be cost effective to produce so that it may be competitively priced.

Thus, what is needed is a raised panel door section for an overhead garage door that is cost effective to produce, durable, low maintenance, impervious to weather and insects, and has an appearance that differs from traditional steel garage door sections.

SUMMARY OF THE INVENTION

It is an advantage of the present invention that a raised panel door section for an overhead garage door is provided.

It is another advantage of the present invention that a raised panel door section is provided to form an aesthetically pleasing overhead garage door.

It is another advantage of the present invention that a raised panel door section is provided that is structurally sound and requires little maintenance.

Yet another advantage of the present invention is that an automated method is provided for cost-effectively producing a sheet metal layer used to form the raised panel door section of the overhead garage door.

The above and other advantages of the present invention are carried out in one form by a raised panel door section for an overhead garage door. The raised panel door section includes a sheet metal layer having an outer surface and an inner surface. The sheet metal layer is embossed to produce a raised panel design by an automated process that selects one of a first die set and a second die set in response to a predetermined embossment style, installs the selected one of the first and second die sets into an embossing press, and embosses the sheet metal layer with the predetermined embossment style. The raised panel door section further includes an insulating foam board having a first side coupled to the inner surface of the sheet metal layer, and a second side having a steel laminate backing. End support members are coupled to first and second lateral edges of the sheet metal layer.

The above and other advantages of the present invention are carried out in another form by an automated method for producing a sheet metal layer having a predetermined embossment style, the sheet metal layer being used to form a raised panel door section of an overhead garage door. The automated method calls for selecting one of a first die set and a second die set in response to the predetermined embossment style. The predetermined embossment style is one of a horizontal raised panel design, a vertical raised panel design, and a horizontal long raised panel design. The first die set is configured to produce the horizontal and vertical raised panel designs, and the second die set is configured to produce the horizontal long raised panel design. The method further calls for installing the selected one of the first and second die sets into an embossing press using an automated conveyer, transferring sheet metal stock into the embossing press, embossing the sheet metal stock with the predetermined embossment style using the selected one of the first and second die sets, and producing a tongue portion on a first longitudinal edge and a groove portion on a second longitudinal edge of the embossed sheet metal stock to form the sheet metal layer.

The above and other advantages of the present invention are carried out in yet another form by an overhead garage door including first, second, and third raised panel door sections, each having a height of substantially twenty-eight inches. Each of the first, second, and third door sections includes a sheet metal layer having an outer surface and an inner surface. The sheet metal layer is embossed to produce a predetermined vertical raised panel design having an embossment height of approximately twenty inches. The sheet metal layer is embossed by an automated process that selects one of a first die set and a second die set in response to the predetermined vertical raised panel design, installs the selected one of the first and second die sets into an embossing press, and embosses the sheet metal layer with the predetermined vertical raised panel design. An insulating foam board has a first side coupled to the inner surface of the sheet metal layer, and a second side having a steel laminate backing. End support members are coupled to first and second lateral edges of the sheet metal layer. The first, second, and third door sections function cooperatively to yield an overall height of the overhead garage door of substantially eighty-four inches, and the vertical raised panel designs of the first, second, and third door section are arranged in three aligned rows.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
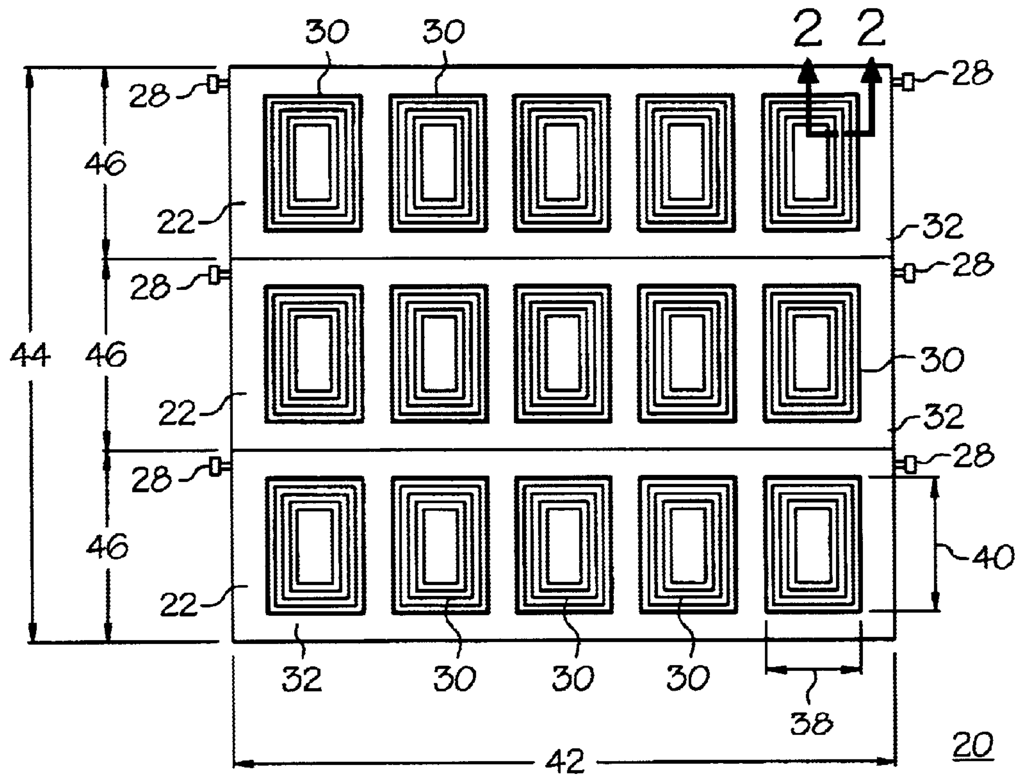
FIG. 1 shows a front view of an overhead garage door having in accordance with a preferred embodiment of the present invention.

FIG. 1 shows a front view of an overhead garage door 20 in accordance with a preferred embodiment of the present invention. Overhead garage door 20 is a sectional garage door having three raised panel door sections 22 that are hinged together.

Guide members 28, attached to opposite ends of each of raised panel door sections 22 allow door 20 to be moved from a vertically oriented closed position to a substantially horizontal open position along a track system (not shown) coupled to a garage (not shown). One exemplary track system including guide members 28 is described in "Door Track", by John F. Jellá, U.S. Pat. No. 5,737,802, issued Apr. 14, 1998, and incorporated by reference herein.

Each of raised panel door sections 22 are embossed with a predetermined embossment style referred to herein as vertical raised panel designs 30. Each of vertical raised panel designs 30 is generally rectangular in shape with the long sides of the rectangular shape being vertically oriented when overhead garage door 20 is in the closed position, hence the use of the term "vertical" in vertical raised panel designs 30.

Figure 2:
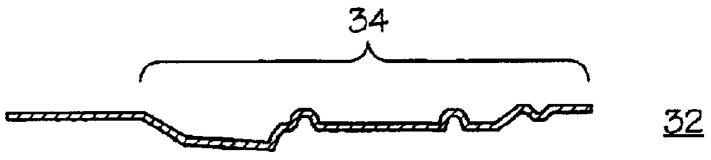
FIG. 2 shows a partial sectional view of a sheet metal layer of the raised panel door sections along line 2—2 in FIG. 1.

Referring to FIG. 2 in connection with FIG. 1, FIG. 2 shows a partial sectional view of a sheet metal layer 32 of raised panel door sections 22 along line 2—2 in FIG. 1. In particular, FIG. 2 shows a portion of a raised ornamentation pattern 34 embossed, or stamped, onto sheet metal layer 32 to produce vertical raised panel design 30 (FIG. 1). Raised ornamentation pattern 34 is embossed onto sheet metal stock using an embossing press 36 (see FIG. 5), and will be discussed detail below.

In an exemplary embodiment, each of vertical raised panel designs 30 has a first design dimension 38 of approximately fourteen inches and a second design dimension 40 of approximately twenty inches. In addition, overhead garage door 20 is characterized by a width 42 of eight feet, or ninety-six inches, and is configured to fit a conventional single car residential garage. Accordingly, five embossments of raised ornamentation pattern 34 are made on sheet metal layer 32 to produce five vertical raised panel designs 30 on each of raised panel door sections 22.

Overhead garage door 20 is also characterized by an overall height 44 of substantially seven feet, or eighty-four inches. Thus, a section height 46 of each of raised panel door sections 22 is substantially twenty-eight inches. The twenty-eight inch height conveniently accommodates second design dimension 40 to produce a balanced and pleasing appearance of vertical raised panel designs 30 on raised panel door sections 22.

In addition, a total of three door sections 22 advantageously decreases a number of section joints from three, created by the four sections of conventional overhead doors, to a total of two section joints. Thus, door 20 having three door sections 22 requires less time to install and uses less door hardware than traditional overhead garage doors having four door sections. Furthermore, the two section joints of garage door 20 are less conspicuous than the three section joints of a conventional four section overhead garage door thereby effectively enhancing the appearance of overhead garage door 20 over conventional four section garage doors. Consequently, the combination of three raised panel door sections 22 with vertical raised panel design 30 results in overhead garage door 20 having a different appearance over the traditional four section steel overhead garage doors having horizontally oriented raised panel designs.

Overhead garage door 20 is described in terms of width 42 of eight feet for clarity of illustration. However, it should be understood that width 42 may be adapted to accommodate the different sizes of openings of a garage. For example, an overhead garage door having a width of sixteen feet would have ten vertical raised panel designs 30 of the fourteen inch first design dimension 38 on each door section. Likewise, a six foot wide overhead garage door would have four vertical raised panel designs 30 on each door section, a twelve foot wide overhead garage door would have eight vertical raised panel designs 30 on each door section, a twenty foot wide overhead garage door would have thirteen vertical raised panel designs 30 on each door section, and so forth.

Figure 3:
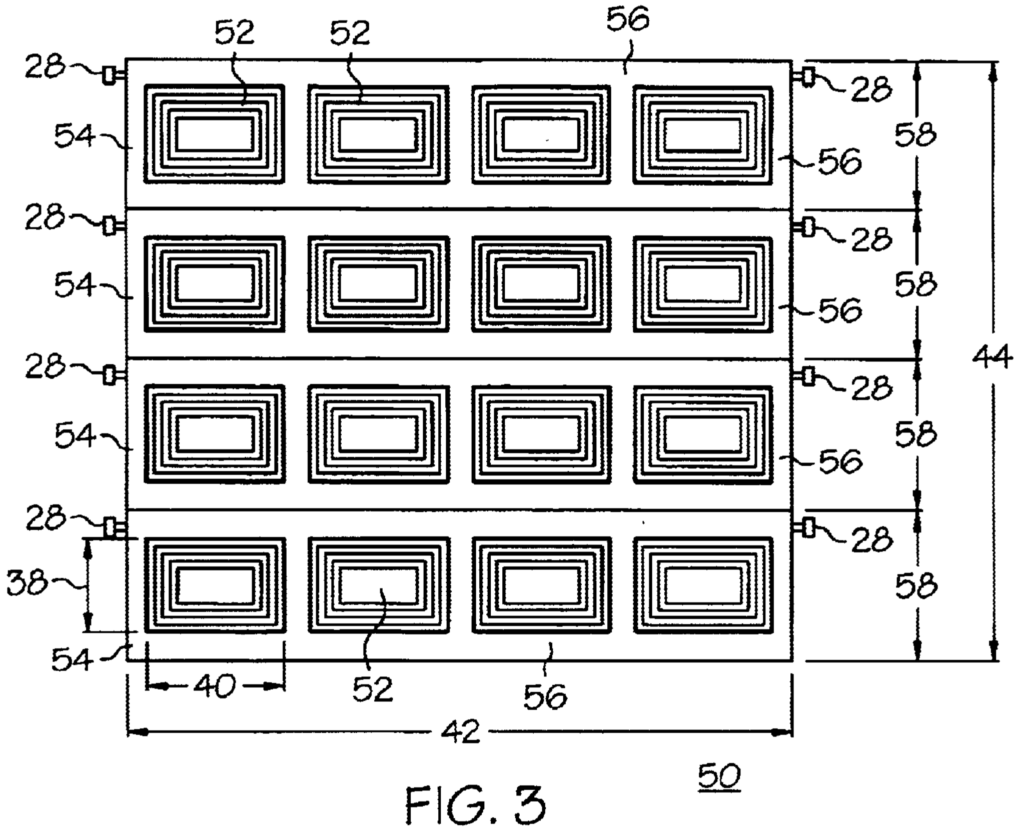
FIG. 3 shows a front view of an overhead garage door having horizontal raised panel designs embossed on raised panel door sections.

FIG. 3 shows a front view of an overhead garage door 50 having horizontal raised panel designs 52 embossed on four raised panel door sections 54 that are hinged together. Like, overhead garage door 20, door 50 includes guide members 28, attached to opposite ends of each of door sections 54. Overhead garage door 50 is configured as a traditional overhead garage door having four door sections 54. However, a sheet metal layer 56 of overhead garage door 50 is advantageously embossed with horizontal raised panel designs 52 using embossing press 36 (FIG. 5), discussed below.

Horizontal raised panel designs 52 form another predetermined embossment style embossed onto sheet metal stock. Horizontal raised panel designs 52 are generally rectangular in shape with the long sides of the rectangular shape being horizontally oriented when overhead garage door 50 is in the closed position, hence the use of the term "horizontal" in horizontal raised panel design 52.

In an exemplary embodiment, overhead garage door 50 is characterized by width 42 of eight feet, or ninety-six inches, and height 44 of seven feet, or eighty-four inches. As such, each of door sections 54 has a section height 58 of substantially twenty-one inches. In addition, each horizontal raised panel design 52 has first design dimension 38 of approximately fourteen inches and second design dimension 40 of approximately twenty inches. However, horizontal raised panel design 52 is rotated ninety degrees relative to vertical raised panel design 30 (FIG. 1).

With the rotation of horizontal raised panel design 52 relative to vertical raised panel design 30 only four embossments of raised ornamentation pattern 34 (FIG. 2) are made on sheet metal layer 56 to produce four horizontal raised panel designs 52 on each of the four door sections 54. However, since there are four door sections 54, overhead garage door 50 includes a total of sixteen horizontal raised panel designs 52, while overhead garage door 20 (FIG. 1) includes a total of fifteen vertical raised panel designs 30 (FIG. 1).

Overhead garage door 50 is described in terms of width 42 of eight feet for clarity of illustration and for direct comparison with overhead garage door 20. However, it should be understood that width 42 may be adapted to accommodate the different sizes of openings of a garage. For example, an overhead garage door having a width of sixteen feet would have eight horizontal raised panel designs 52 of the twenty inch second design dimension 40 on each door section. Likewise, a six foot wide overhead garage door would have three horizontal raised panel designs 52 on each door section, a twelve foot wide overhead garage door would have six horizontal raised panel designs 52 on each door section, a twenty foot wide overhead garage door would have ten horizontal raised panel designs 52 on each door section, and so forth.

Figure 4:
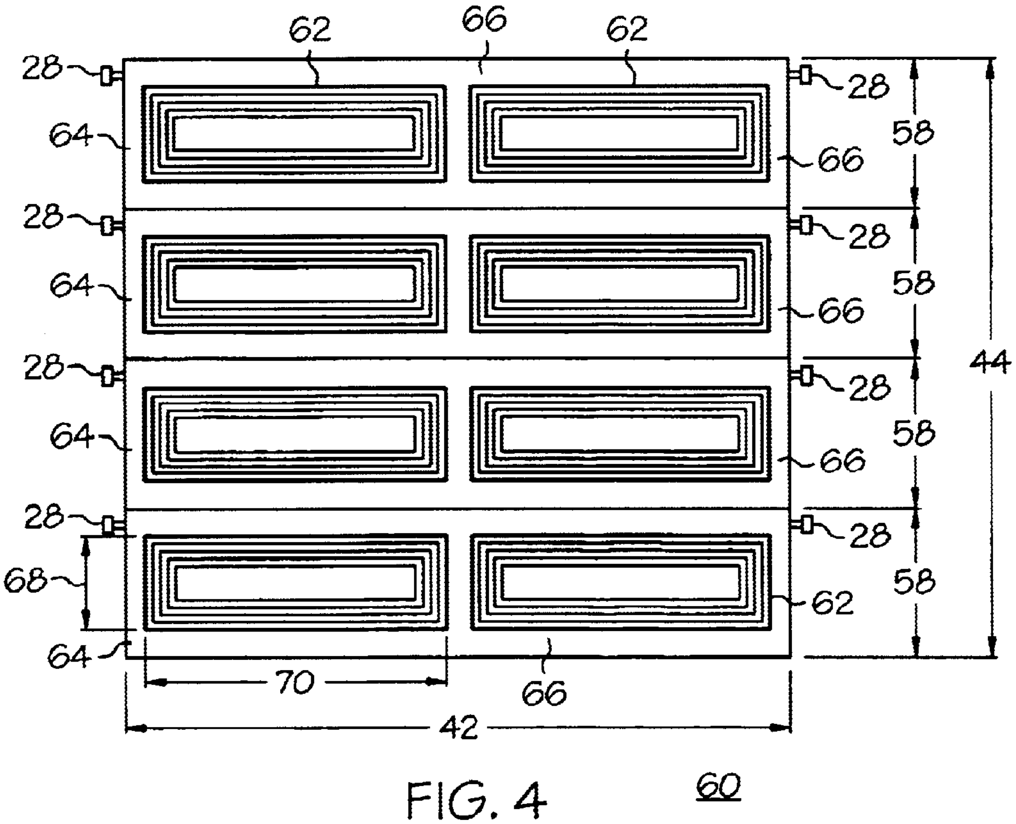
FIG. 4 shows a front view of an overhead garage door having horizontal long raised panel designs embossed on raised panel door sections.

FIG. 4 shows a front view of an overhead garage door 60 having a horizontal long raised panel design 62 embossed on raised panel door sections 64 that are hinged together. Like, overhead garage door 20 (FIG. 1) and overhead garage door 50, door 60 includes guide members 28, attached to opposite ends of each of door sections 64. Overhead garage door 60 is configured as a traditional four door section overhead garage door. However, a sheet metal layer 66 of overhead garage door 60 is advantageously embossed with horizontal long raised panel designs 62 using embossing press 36 (FIG. 5), discussed below.

Horizontal long raised panel designs 62 form yet another predetermined embossment style embossed onto sheet metal stock. Horizontal long raised panel designs 62 are generally rectangular in shape with the long sides of the rectangular shape being horizontally oriented when overhead garage door 60 is in the closed position, hence the use of the term "horizontal" in horizontal long raised panel design 52.

In an exemplary embodiment, overhead garage door 60 is characterized by width 42 of eight feet, or ninety-six inches, and height 44 of seven feet, or eighty-four inches. As such, each of door sections 64 has section height 58 of substantially twenty-one inches. In addition, each horizontal raised panel design 62 has a first design dimension 68 of approximately fourteen inches that is vertically oriented when overhead garage door 60 is in the closed position. In addition, first each horizontal long raised panel design 62 has a second design dimension 70 of approximately forty-three inches, hence the use of the term "long" in horizontal long raised panel design 62.

The dimensions of horizontal long raised panel design 62 result in only two embossments of raised ornamentation pattern 34 (FIG. 2) being made on sheet metal layer 66 to produce two horizontal long raised panel designs 62 on each of the four door sections 64. Since there are four door sections 64, overhead garage door 60 includes a total of eight horizontal raised long panel designs 62.

Overhead garage door 60 is described in terms of width 42 of eight feet for clarity of illustration and for direct comparison with overhead garage door 20 (FIG. 1) and overhead garage door 50 (FIG. 3). However, it should be understood that width 42 may be adapted to accommodate the different sizes of openings of a garage. For example, an overhead garage door having a width of sixteen feet would have four horizontal long raised panel designs 62 of the forty-three inch second design dimension 70 on each door section. Likewise, a six foot wide overhead garage door would have one horizontal long raised panel design 62 on each door section, a twelve foot wide overhead garage door would have three horizontal long raised panel designs 62 on each door section, a twenty foot wide overhead garage door would have five horizontal raised panel designs 62 on each door section, and so forth.

Figure 5:
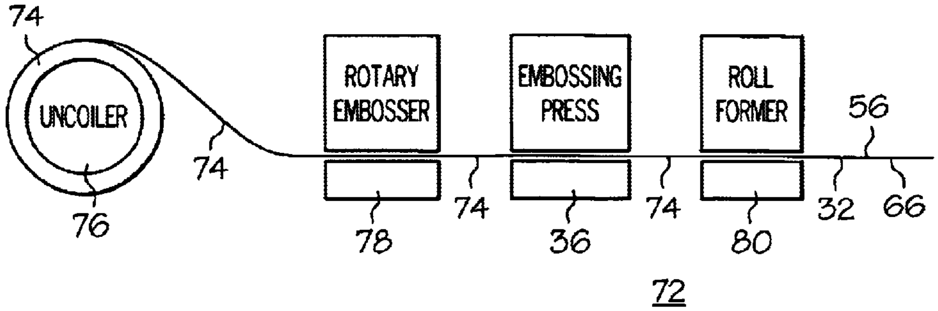
FIG. 5 shows a block diagram of an automated method for producing a sheet metal layer used to form a raised panel door section of the overhead garage doors of FIGS. 1, 3, and 4.

FIG. 5 shows a block diagram 72 of an automated method for producing one of sheet metal layers 32, 56, and 66 used to form vertical, horizontal, and horizontal long raised panel door sections 30, 52, and 62, respectively, of overhead garage doors 20, 50, and 60 (FIGS. 1, 3, and 4). Generally, sheet metal stock 74, mounted on an uncoiler 76 is fed into a conventional rotary embosser 78. Rotary embosser 78 stamps sheet metal stock 74 with a wood grain pattern. Sheet metal stock 74 is then transferred into embossing press 36. Embossing press 36 embosses sheet metal stock 74 with one of vertical, horizontal, and horizontal long raised panel door sections 30, 52, and 62, respectively. Sheet metal stock 74 is subsequently fed into a roll former 80. Roll former 80 produces tongue and groove portions (discussed below) on longitudinal edges of sheet metal stock 74 to form one of sheet metal designs 32, 56, and 66. Sheet metal stock 74 may be conveyed between rotary embosser 78, embossing press 36, and roll former 80 via an automated conveyance system (not shown).

As known to those skilled in the art, uncoiler 76 functions to uncoil a reel of sheet metal stock 74. As uncoiler 76 uncoils sheet metal stock 74, uncoiler 76 also straightens sheet metal stock 74. In addition, uncoiler 76 may include a transverse cutter (not shown) for cutting off the straightened sheet metal stock 74 to a specified length. Sheet metal stock 74 cut to the specified length may then be fed into rotary embosser 78. Alternatively, uncoiler 76 may not include a transverse cutter. Thus, the uncut sheet metal stock 74 would be fed into rotary embosser 78 and subsequently embossing press 36. Embossed sheet metal stock 74 would then be fed into a transverse cutting machine prior to being fed into roll former 80 for cutting off the embossed sheet metal stock 74 to a specified length.

As known to those skilled in the art, roller former 80 performs a progressive process in which sheet metal stock 74 is shaped by a series of rolls, each roll slightly changing the shape of sheet metal stock. When sheet metal stock 74 reaches the end of the line, i.e., the last roll is made in sheet metal stock 74, the desired shape is achieved. Roll forming produces high quality products quickly and inexpensively compared to traditional press operations and is desirable for producing long shapes.

Figure 6:
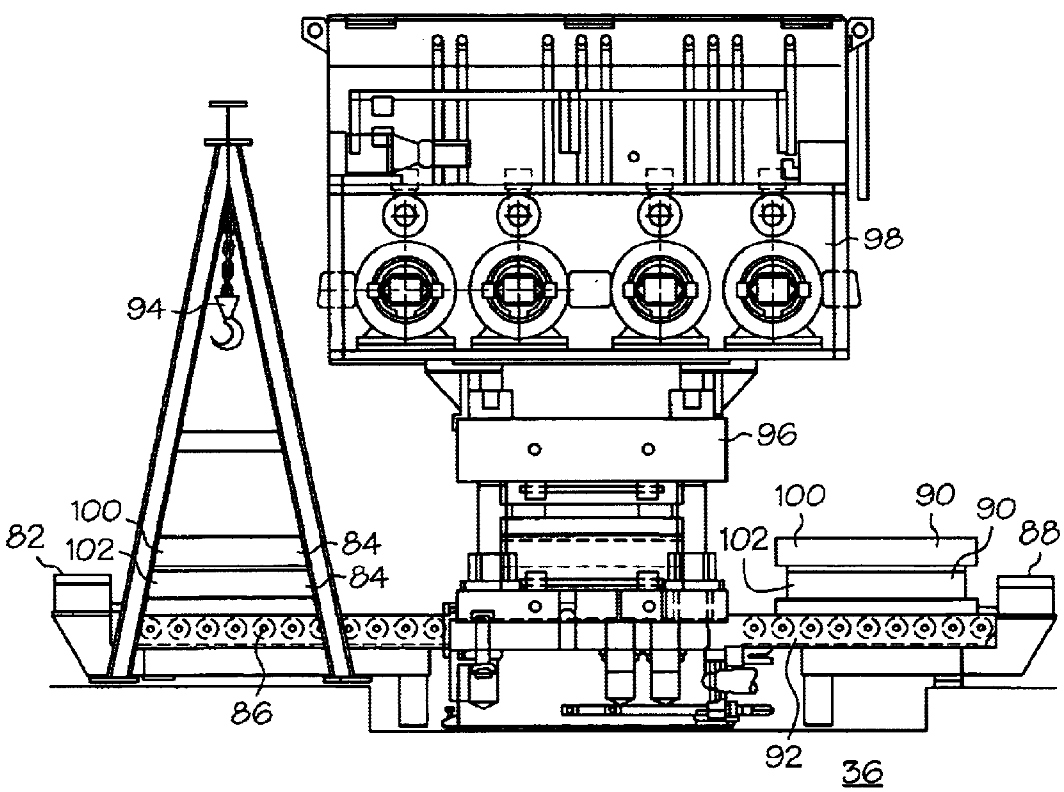
FIG. 6 shows a side view of an embossing press used in the automated method illustrated in the block diagram of FIG. 5.

FIG. 6 shows a side view of embossing press 36 used in the automated method illustrated in block diagram 72 (FIG. 5). Embossing press 36 functions to emboss vertical, horizontal, and horizontal long panel designs 30, 52, and 62, respectively (FIGS. 1, 3, and 4) onto sheet metal stock 74 (FIG. 5). As discussed previously, in order to gain acceptance in the industry, a steel overhead garage door cannot simply be different in appearance, it should also be cost effective to produce so that it may be competitively priced. Embossing press 36 is configured to emboss any of the embossment styles discussed above, i.e., vertical, horizontal, and horizontal long panel designs 30, 52, and 62. Thus, a garage door manufacturer achieves savings in terms of equipment investment because the manufacturer has no need for a separate embossing press for each embossment style. Moreover, embossing press 36 advantageously accommodates the twenty-eight inch section height 46 of raised panel door sections 22 without incurring significant retooling costs.

Generally, embossing press 36 includes a first die changer 82 for moving a first die set 84 under automated control along a first conveyer system 86 and a second die changer 88 for moving a second die set 90 under automated control along a second conveyer system 92. First die set 84 is configured to produce one of vertical raised panel designs 30 (FIG. 1) and horizontal raised panel designs 52 (FIG. 3) in response to a predetermined desired embossment style. Second die set 90 is configured to produce one of horizontal long raised panel designs 62 (FIG. 4) in response to a predetermined desired embossment style.

A winch 94 is positioned over first conveyer system 86. Winch 94 couples to first die set 84 and rotates first die set 84 ninety degrees to change the orientation of first and second design dimensions 38 and 40, respectively, to produce one of vertical and horizontal raised panel designs 30 and 52, respectively. Embossing press 36 further includes a press platen 96 coupled to a hydraulic press system 98.

Through processor control, embossing press 36 selects one of first die set 84 and second die set 90 in response to a predetermined embossment style. In other words, first die set 84 is selected when the predetermined embossment style is one of vertical and horizontal raised panel designs 30 and 52. Alternatively, second die set 90 is selected when the predetermined embossment style is horizontal long raised panel design 62.

Since embossing press 36 can emboss three different raised panel designs, i.e., vertical, horizontal, and horizontal long raised panel designs 30, 52, 62, using either of first and second die sets 84 and 90, the selecting operation entails determining whether one of first and second die sets 84 and 90 is already installed in embossing press 36.

Each of first and second die sets 84 and 90, respectively, includes a first die 100 and a second die 102 of a matched pair of hardened steel blocks. First die 100 is attachable to press platen 96, and first die 100 is lifted, or separated, by press platen 96 from second die 102 so that sheet metal stock 74 may fed between first and second dies 100 and 102. Thus, one of first and second die sets 84 and 90 is installed in embossing press 36 when the one of first and second die sets 84 and 90 is located beneath press platen 96, and first die 100 is attached to press platen 96 (as shown in ghost form beneath press platen 96 by dashed lines in FIG. 6).

In an exemplary scenario, when second die set 90 is selected and it is determined that first die set 84 is installed in embossing press 36, first die 100 of first die set 84 is disengaged from press platen 96, and first die set 84 is removed under automated control from embossing press 36 over first conveyer system 86 using first die changer 82. Second die set 90 is then conveyed under automated control over second conveyer system 92 into embossing press 36 using second automated die changer 88. First die 100 of second die set 90 is then attached to press platen 96 and first die 100 is lifted from second die 102 so that sheet metal stock 74 may be fed between first and second dies 100 and 102 of second die set 90.

When first die set 84 is selected and it is determined that second die set 90 is installed in embossing press 36, first die 100 of second die set 90 is disengaged from press platen 96, and second die set 90 is removed from embossing press 36 over second conveyer system 92 using second automated die changer 88.

Figure 7:
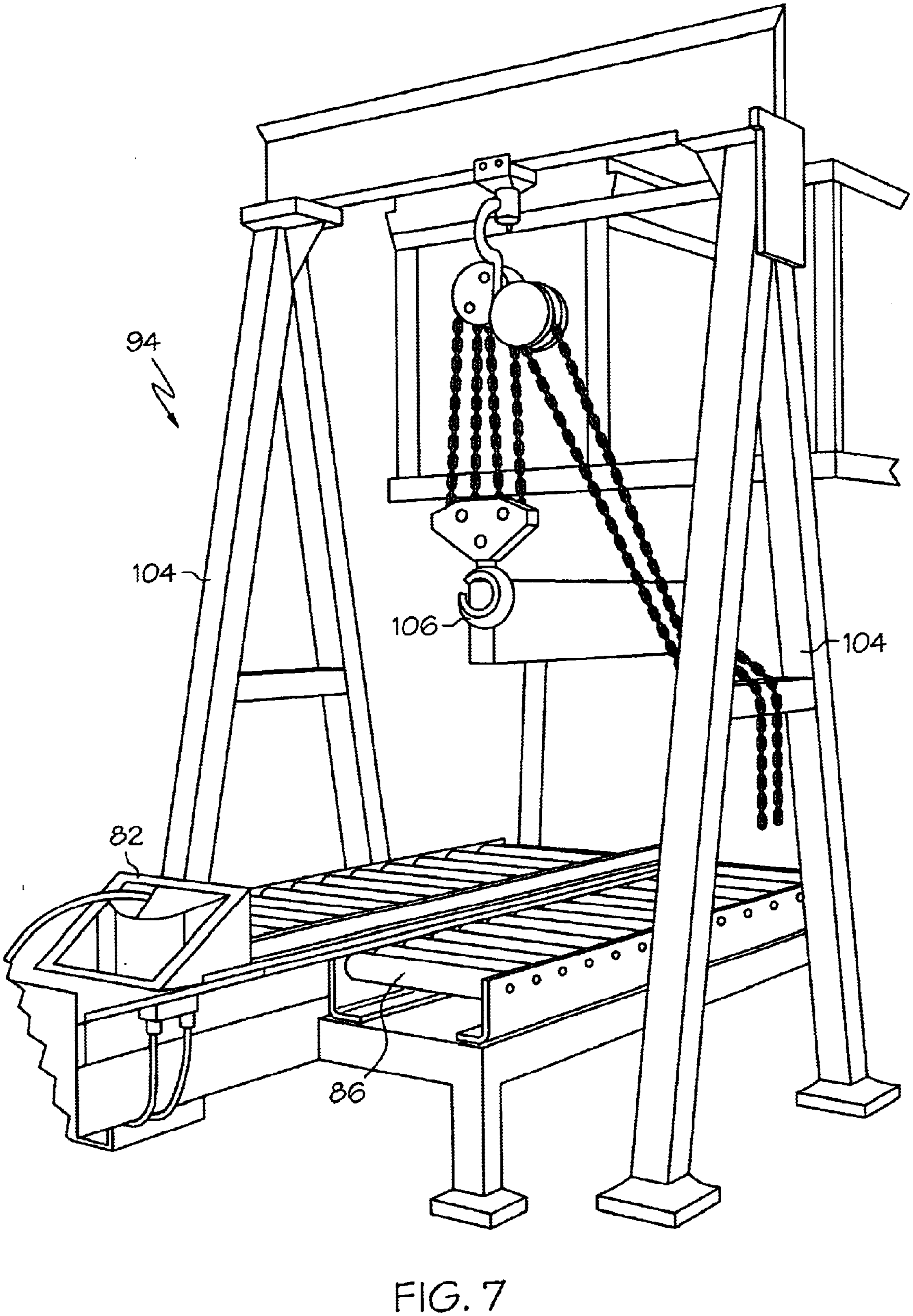
FIG. 7 shows a perspective view of a winch system of the embossing press 36 of FIG. 6.

Referring to FIG. 7 in connection with FIG. 6, FIG. 7 shows a perspective view of winch 94 of embossing press 36. Winch 94 generally includes a frame 104 to which a motor driven hoist mechanism 106 is coupled. Prior to installation into embossing press 36, first die set 84 may require rotation in order to produce the selected one of vertical and horizontal raised panel designs 30 and 52, respectively.

By way of example, if the predetermined embossment style is vertical raised panel design 30 (FIG. 1) and first die set 84 is configured to produce horizontal raised panel design 52 (FIG. 3), hoist mechanism 106 is attached to first die set 84 located on first conveyer system 86. First die set 84 is lifted off of first conveyer system 86 and rotated ninety degrees by winch 94, then placed back onto first conveyer system 86.

Following the removal of second die set 90 from embossing press 36 and the rotation of first die set 84 by winch 94 (as necessary), first die set is installed in embossing press 36. That is, first die set 84 is conveyed under automated control over first conveyer system 86 into embossing press 36 using first automated die changer 82. First die 100 of first die set 84 is then attached to press platen 96 and first die 100 is lifted from second die 102 so that sheet metal stock 74 may be fed between first and second dies 100 and 102 of first die set 84.

It should be understood that other arrangements of first and second die sets 84 and 90, respectively, may be determined. For example, it may be determined that neither of first and second die sets 84 and 90 are installed in embossing press 36. As such, the disengagement operations described above need not occur. That is, the selected one of first and second die sets 84 and 90, with or without initially rotating first die set 84, is merely conveyed into embossing press 36 and attached to press platen 96.

Alternatively, when the predetermined embossment style is one of vertical and horizontal raised panel designs 30 and 52, respectively, and it is determined that first die set 84 is installed in embossing press 36 to produce the other of vertical and horizontal raised panel designs 30 and 52, first die set 84 is disengaged from press platen 96 and removed from embossing press 36 over first conveyer system 86 using first die changer 82. First die set 84 is then rotated under motorized control using winch 94 and reinstalled back into embossing press 36.

Following installation of one of first and second die sets 84 and 90, respectively, pressure is imparted onto press platen 96 from hydraulic press system 98, which transmits that pressure to first die 100. First die 100 subsequently meshes with second die 102 to emboss one of vertical, horizontal, and horizontal long raised panel designs 30, 52, and 62 onto sheet metal stock 74 (FIG. 5). Thus, embossing press 36 efficiently embosses one of three predetermined embossment styles on sheet metal stock 74 (FIG. 5) using one of first and second die sets 84 and 90, first die set 84 being rotatable to produce one of vertical and horizontal raised panel designs.

Figure 8:
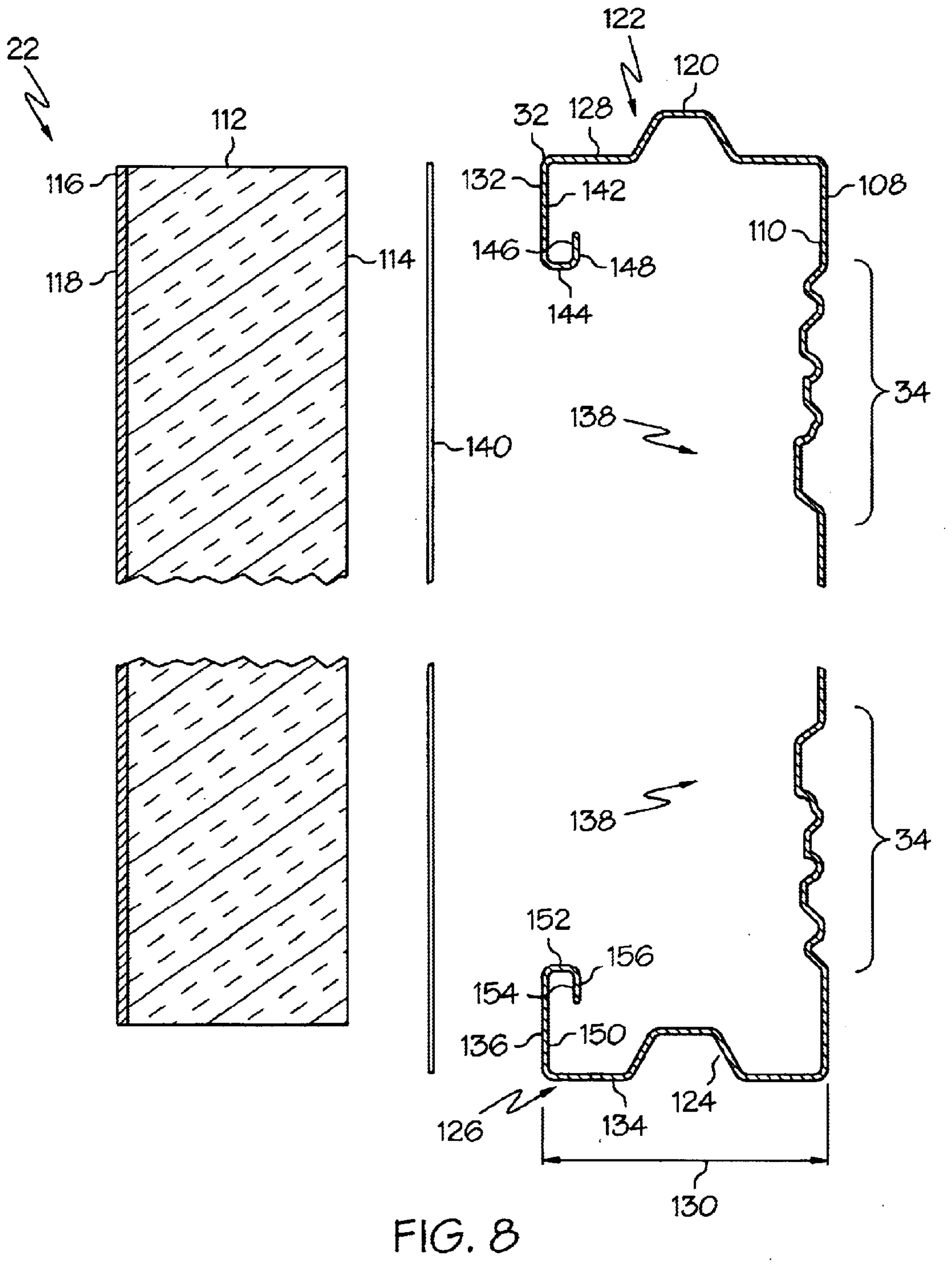
FIG. 8 shows a partial, exploded side view of a raised panel door section of the overhead garage door of FIG. 1.

FIG. 8 shows a partial, exploded side view of raised panel door section 22 of overhead garage door 20 (FIG. 1). The structure of one of raised panel door sections 22 is described for clarity of description. However, it should be understood that raised panel door sections 54 (FIG. 3) and raised panel door sections 64 (FIG. 4) are fabricated similarly. The differences between the raised panel door sections are the shape and orientation of the raised panel designs, as described above, and the section height, described above. Consequently, the following description of the structure of raised panel door section 22 applies to raised panel door sections 54, and raised panel door sections 64, as well.

Raised panel door section 22 includes sheet metal layer 32 having an outer surface 108 and an inner surface 110. As discussed above, sheet metal layer 32 is rotary embossed with a wood grain pattern and embossed with raised ornamentation pattern 34 to produce vertical raised panel designs 30 (FIG. 1). An insulating foam board 112 has a first side 114 coupled to inner surface 110 of sheet metal layer 32 and a second side 116 having a steel laminate backing 118. In a preferred embodiment, sheet metal layer 32 is formed from twenty-four gauge steel. Although twenty-four gauge steel is preferred, it should be apparent to those skilled in the art that other widths of steel may be utilized. Alternatively, other metals, such as aluminum, formed into sheets may be utilized.

As discussed above roll former 80 (FIG. 5) roll forms sheet metal stock 74 (FIG. 5) to produce sheet metal layer 32 having a tongue portion 120 along a first longitudinal edge 122 and a groove portion 124 located along a second longitudinal edge 126 of sheet metal layer 32. The roll forming of sheet metal layer 32 produces tongue portion 120 having a tongue surface 128 spanning a width 130 of sheet metal layer 32 and a first rear support section 132 contiguous with tongue surface 128. Likewise, the roll forming of sheet metal layer 32 produces groove portion 124 having a groove surface 134 that spans width 130 of sheet metal layer 32 and a second rear support section 136 contiguous with groove surface 134. As such, a cavity 138 is formed in raised panel door section 22.

Insulating foam board 112 is positioned in cavity 138 and first side 114 is bonded to inner surface 110 of sheet metal layer 32 using an adhesive 140. In an exemplary embodiment, adhesive 140 is a hot melt polyurethane reactive (PUR) adhesive. Hot melt PUR adhesive is preferred because it may be applied to a substrate as a dot or as a thin glue line, rather than using a slot die or roll coater. In addition, hot melt PUR adhesive sets in seconds and is structurally rigid in minutes following a final set. Although hot melt PUR adhesive is preferred, it should be apparent to those skilled in the art, that other adhesives may be used in place of hot melt PUR adhesive that have these similar properties.

Insulating foam board 112 is formed from polystyrene foam board insulation. A density of polystyrene insulating foam board 112 is approximately two pounds per cubic foot. Accordingly, polystyrene insulating foam board 112 is known as two-pound-density expanded polystyrene (EPS) foam insulation. Insulating foam board 112 of two-pound-density EPS is desirable due to the thermal performance and structural rigidity of two-pound-density EPS. Although two-pound-density EPS is preferred, it should be apparent to those skilled in the art that other insulating materials may be used. For example, other densities of EPS, polyurethane, and polyisocyanurate are available as rigid foam boards having effective thermal performance.

In a preferred embodiment, steel laminate backing 118 is twenty-six gauge steel laminated, or bonded, to second side 116 of insulating foam board 112. Insulating foam board 112 having twenty-six gauge steel laminate backing 118 is desirable for producing raised panel door section 22 having effective thermal performance and structural rigidity. Although twenty-six gauge steel is preferred for steel laminate backing 118, it should be apparent to those skilled in the art that other widths of steel may be utilized. Alternatively, other metals, such as aluminum, formed into sheets may be utilized.

First and second rear support sections 132 and 136, respectively, are configured to abut steel laminate backing 118 when insulating foam board 112 is installed into cavity 138. In particular, first rear support section 132 includes a first segment 142 oriented substantially perpendicular to and contiguous with tongue surface 128. First segment 142 extends toward second longitudinal edge 126. A second segment 144, contiguous with first segment 142, is formed through the roll forming process and extends toward inner surface 110 of sheet metal layer 32. A third segment 146, contiguous with second segment 144, is formed through the roll forming process and extends toward first longitudinal edge 122. Third segment 146 has a first planar side 148 that abuts steel laminate backing 118 of insulating foam board 112.

Second rear support section 136 is similar to first rear support section 132. In particular, second rear support section 136 includes a first segment 150 oriented substantially perpendicular to and contiguous with groove surface 134. First segment 150 extends toward first longitudinal edge 122. A second segment 152, contiguous with first segment 150 extends toward inner surface 110 of sheet metal layer 32, and a third segment 154, contiguous with second segment 152 extends toward second longitudinal edge 126. Third segment 154 has a second planar side 156 that abuts steel laminate backing 118 of insulating foam board 112. First and second rear support sections 132 and 136, respectively, function to further retain insulating foam core 112 and to provide rigidity and strength to raised panel door section 22.

Figure 9:
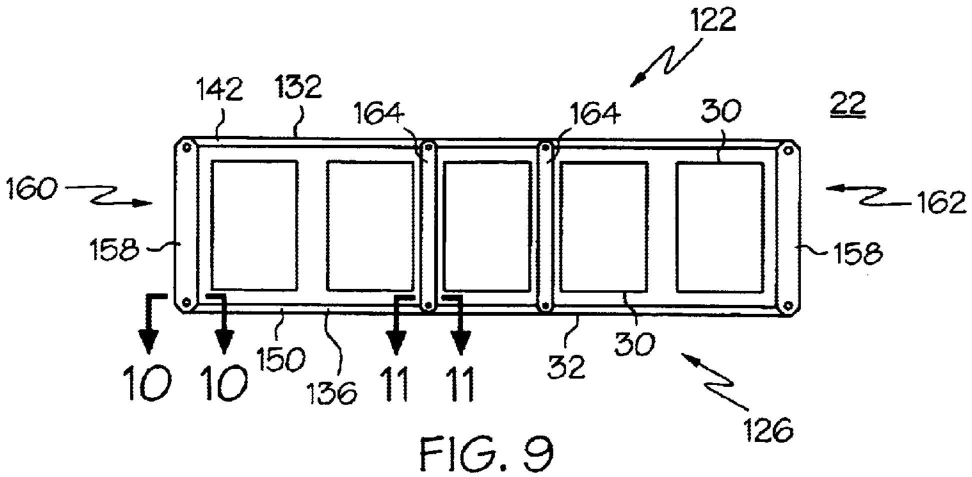
FIG. 9 shows a rear view of a raised panel door section of the overhead garage door of FIG. 1.

FIG. 9 shows a rear view of one of raised panel door sections 22 of overhead garage door 20 (FIG. 1). As discussed in connection with FIG. 8, the structure of raised panel door section 22 is described for clarity of description. However, the following description of raised panel door section 22 applies to raised panel door sections 54 (FIG. 3) and raised panel door sections 64 (FIG. 4) as well.

Raised panel door section 22 further includes end support members 158 coupled to first and second lateral edges 160 and 162, respectively, of sheet metal layer 32. In particular, end support members 158 are stapled to first segment 142 of first rear support section 132 along first and second lateral edges 160 and 162. Likewise, end support members 158 are stapled to first segment 150 of second rear support section 136 along first and second lateral edges 160 and 162. End support members 158 provide structural rigidity along first and lateral edges 160 and 162, and provide a mounting surface for guide members 28 (FIG. 1).

Raised panel door section 22 also includes center support members 164 coupled to first and second longitudinal edges 122 and 126, respectively, of sheet metal layer 32. In particular, center support members 164 are stapled to each of first segment 142 of first rear support section 132 and first segment 150 of second rear support section 136. Center support members 164 provide structural rigidity along width 42 (FIG. 1) of overhead garage door 20 (FIG. 1). In particular, center support members 164 function to prevent raised panel door section 22 from bowing along width 42 between first and second lateral edges 108 and 110, respectively.

In a preferred embodiment, when width 42 of door 20 (FIG. 1) is eight feet, raised panel door section 22 includes two center support members 112 located approximately central to width 164. When width 42 of door 20 is ten to twelve feet, second door section 22 may include two or three spaced-apart center support members 164. When width 42 is greater than twelve feet, for example, sixteen or eighteen feet, second raised panel door section 22 may include three or four spaced-apart center support members 164.

Vertical raised panel designs 30 are illustrated in FIG. 9 to show the locations of end support members 158 and center support members 164 relative to vertical raised panel designs 30. However, it should be understood that when insulating foam board 112 (FIG. 8) is installed in cavity 138 (FIG. 8), vertical raised panel designs 30 are not visible in a rear view of raised panel door section 22.

Figure 10:
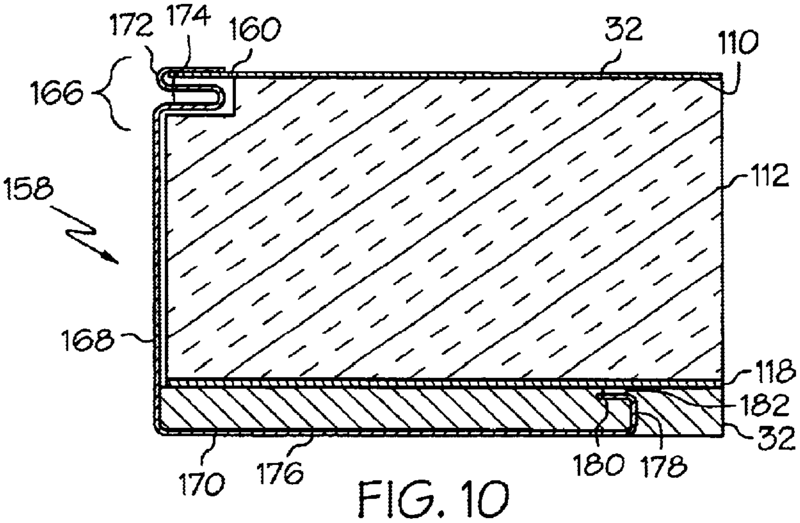
FIG. 10 shows a sectional view of an end support member along line 10—10 in FIG. 9.

FIG. 10 shows a sectional view of one of end support members 158 along line 10—10 in FIG. 9. Each of end support members 158 includes a fanfold section 166, a span section 168 contiguous with fanfold section 166, and a rear support section 170 contiguous with span section 168. End support members 158 are shaped by roll forming twenty-four to twenty-six gauge steel.

As shown in FIG. 10, fanfold section 166 has a first fold 172 configured to mesh with first lateral edge 160 of sheet metal layer 32. A second fold 174 lies against inner surface 110 of sheet metal layer 32 to provide strength. Span section 168 extends away from inner surface 110 of sheet metal layer 32 to conceal insulating foam board 112. As shown, insulating foam board 112 is notched to accommodate second fold 174.

Rear support section 170 includes a first segment 176 oriented substantially perpendicular to span section 168 and extending toward second lateral edge 162. A second segment 178, contiguous with first segment 176, is bent through the roll forming process and extends toward inner surface 110 of sheet metal layer 32. A third segment 180, contiguous with second segment 178, is bent through the roll forming process and extends toward first lateral edge 160. Third segment 180 has a planar side 182 that abuts steel laminate backing 118 of insulating foam board 112.

Figure 11:
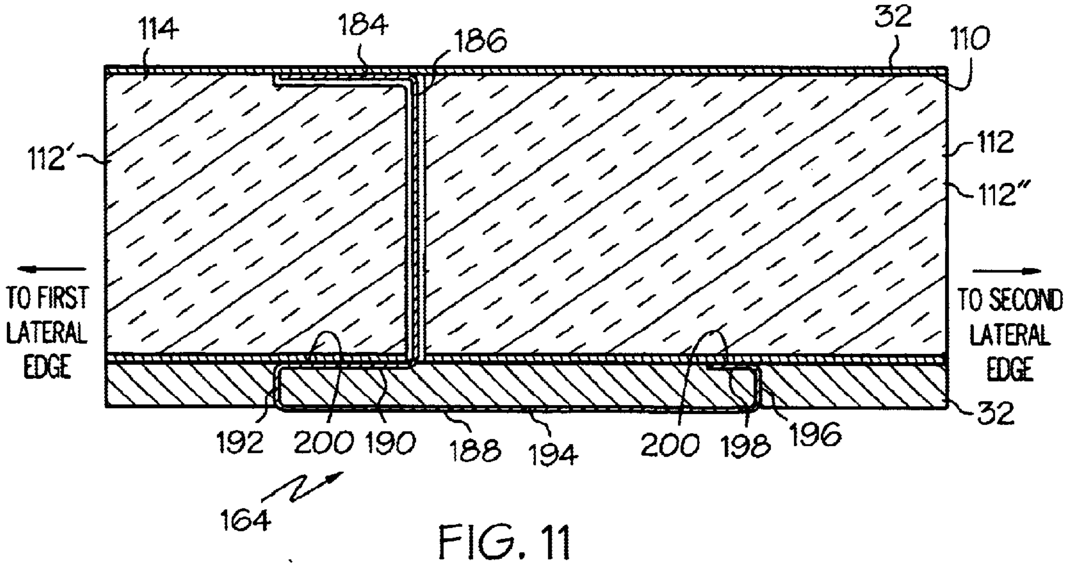
FIG. 11 shows a sectional view of a center support member along line 11—11 in FIG. 9.

FIG. 11 shows a sectional view of one of center support members 164 along line 11—11 in FIG. 9. Center support member 164 includes an inner support section 184, a span section 186 contiguous with inner support section 184, and a rear support section 188 contiguous with span section 186. Center support member 164 is shaped by roll forming twenty-four to twenty-six gauge steel.

As shown in FIG. 11, inner support section 184 is interposed between inner surface 110 of sheet metal layer 32 and first side 114 of insulated foam board 112. Span section 186 extends away from inner surface 110 of sheet metal layer 32. Insulated foam board 112 is split into two portions, referred to herein as first insulated foam board 112' and second insulated foam board 112", so that span section 186 may be located between first and second insulated foam boards 112' and 112", respectively.

Rear support section 188 includes a first segment 190 oriented substantially perpendicular to and contiguous with span section 186. First segment 190 extends toward first lateral edge 160 (FIG. 9) of sheet metal layer 33. A second segment 192, contiguous with first segment 190, is bent through the roll forming process to extend away from inner surface 110 of sheet metal layer 32. A third segment 194, contiguous with second segment 192, is bent through the roll forming process to extend toward second lateral edge 162 (FIG. 9) of sheet metal layer 32. A fourth segment 196, contiguous with third segment 194, is bent through the roll forming process to extend toward inner surface 110 of sheet metal layer 32. A fifth segment 198, contiguous with fourth segment 196, is bent through the roll forming process to extend back toward first lateral edge 160 of sheet metal layer 32. Each of first and fifth segments 190 and 198, respectively, have a planar side 200 that abuts steel laminate backing 118 of insulating foam board 112.

In addition, to preventing bowing of raised panel door section 22 along width 42, center support members 164 also provide structural rigidity throughout a thickness of raised panel door section 22. This structural rigidity is provided by the cooperative relationship between inner support section 184, span section 186, and rear support section 188 and by roll forming each of center support members 164 from one piece of steel.

Figure 12:
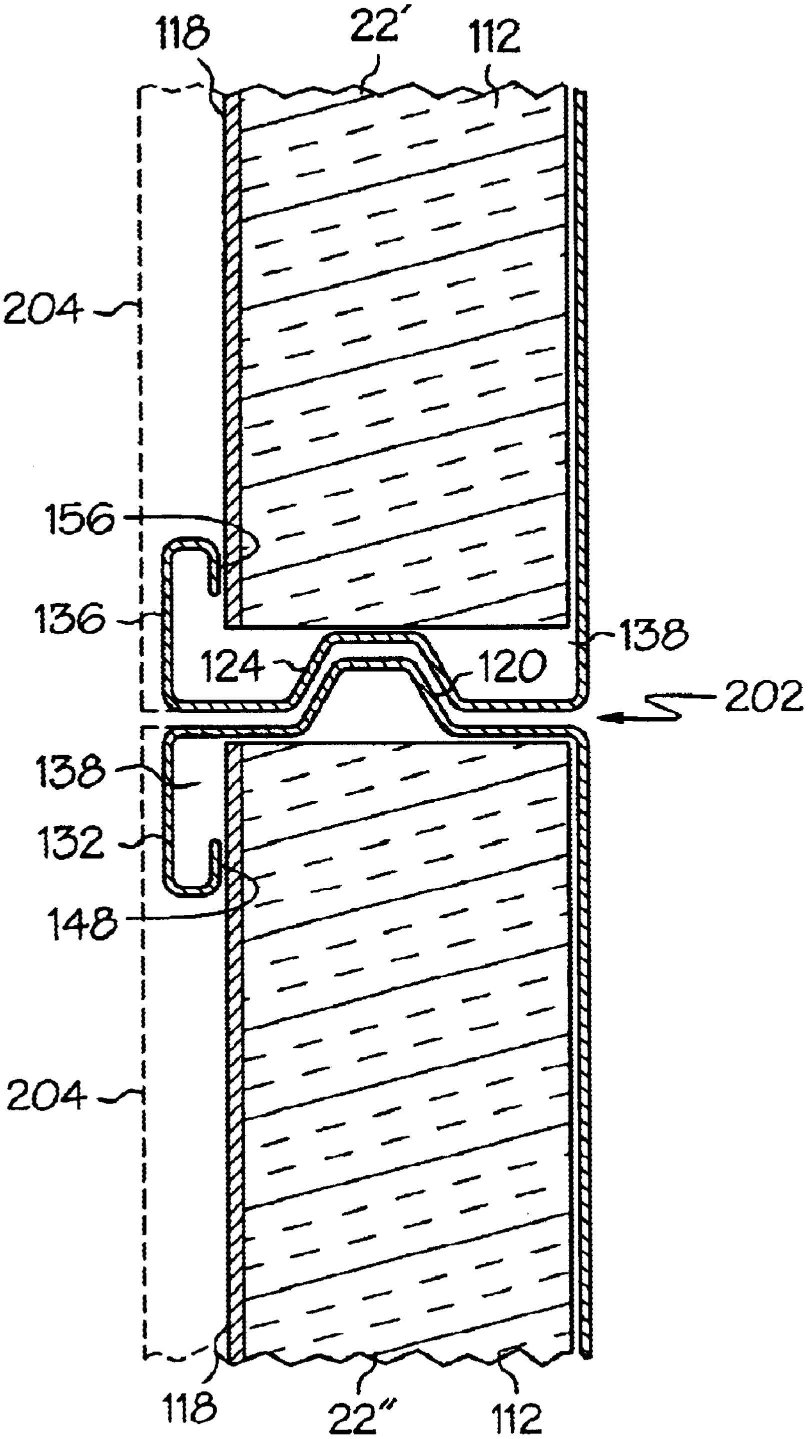
FIG. 12 shows a partial side view of a section joint between two raised panel door sections of the overhead garage door of FIG. 1.

FIG. 12 shows a partial side view of a section joint 202 between two raised panel door sections 22 of overhead garage door 20 (FIG. 1). For example, a section joint 202 is formed between a first one of raised panel door sections 22, referred to herein as first raised panel door section 22', and a second one of raised panel door sections 22, referred to herein as second raised panel door section 22". As shown, tongue portion 120 of second raised panel door section 22" mates with groove portion 124 of first raised panel door section 22'. Although not shown, groove portion 124 of second raised panel door section 22" mates with tongue portion 120 of a third one of raised panel door sections 22 in the same manner. Likewise, raised panel door sections 54 (FIG. 3) of overhead garage door 50 (FIG. 3) and raised panel door sections 64 (FIG. 4) of overhead garage door 60 (FIG. 4) have similarly mating tongue and groove portions.

FIG. 12 also shows foam insulating layer 112 with steel laminate backing 118 positioned in cavity 138. Second planar side 156 of second rear support section 136 abuts steel laminate backing 118 located in first raised panel door section 22'. Likewise, first planar side 148 of first rear support section 132 abuts steel laminate backing 118 located in second raised panel door section 22". Dashed lines 204 represent the relationship between the location of end support members 158 (FIG. 9) and center support members 164 (FIG. 9) relative to first rear support section 132 of sheet metal layer 32 of second door section 22". Similarly, dashed lines 204 represent the relationship between the location of end support members 158 and center support members 164 relative to second rear support section 136 of sheet metal layer 32 of first door section 22'.

In summary, the present invention teaches of a raised panel door section for an overhead garage door. The raised panel door section exhibits one of three embossment styles, a vertical raised panel design, a horizontal raised panel design, and a horizontal long raised panel design. One of the three embossment styles is used to form an aesthetically pleasing overhead garage door. In particular, the vertical raised panel design is embossed onto twenty-eight inch raised panel door sections that are used to form an overhead door having three door sections. The three door section overhead garage door advantageously requires less time to install and less door hardware than traditional overhead garage doors having four door sections. Moreover, the use of three door sections decreases the production time of a garage door from the production time required for a traditional four section door. The sandwich structure of the sheet metal layer and the foam insulating board with the steel laminate back combined with the end members and center support structures results in an overhead garage door that is structurally sound and requires little maintenance. Furthermore, the automated method with an embossing press that selects, rotates, conveys, and installs one of two die sets results in the cost effective production of sheet metal layers having one of the three embossment styles.

Although the preferred embodiments of the invention have been illustrated and described in detail, it will be readily apparent to those skilled in the art that various modifications may be made therein without departing from the spirit of the invention or from the scope of the appended claims. For example, a different die set may be used that produces a different raised ornamentation pattern or a differently dimensioned raised panel design on the sheet metal stock. In addition, another winch system may be added to the embossing press so that each of the two die sets may be rotated ninety degrees to effectively achieve a fourth raised panel design.

What is claimed is:

1. An automated method for producing a sheet metal layer having a predetermined embossment style, said sheet metal layer being used to form a raised panel door section of an overhead garage door, said automated method comprising:

selecting one of a first die set and a second die set in response to said predetermined embossment style, said predetermined embossment style being one of a horizontal raised panel design, a vertical raised panel design, and a horizontal long raised panel design, said first die set being configured to produce said horizontal and vertical raised panel designs, and said second die set being configured to produce said horizontal long raised panel design;

installing said one of said first and second die sets into an embossing press using an automated conveyer;

transferring sheet metal stock into said embossing press; and embossing said sheet metal stock with said predetermined embossment style using said selected one of said first and second die sets.

2. An automated method as claimed in claim 1 further comprising stamping said sheet metal stock with a wood grain pattern using a rotary embosser prior to transferring said sheet metal stock into said embossing press.

3. An automated method as claimed in claim 1 wherein when said predetermined embossment style is one of said horizontal and vertical raised panel designs, said selecting operation comprises:

determining said first die set is installed in said embossing press to produce the other of said horizontal and vertical raised panel designs;

disengaging said first die set from a platen of said embossing press;

removing said first die set from said embossing press using said automated conveyer; and rotating said first die set approximately ninety degrees using an automated winch of said embossing press prior to said installing operation.

4. An automated method as claimed in claim 1 wherein when said predetermined embossment style is one of said horizontal and vertical raised panel designs, said selecting operation comprises:

determining said second die set is installed in said embossing press;

disengaging said second die set from a platen of said embossing press; and removing said second die set from said embossing press using a second automated conveyer prior to said installing operation.

5. An automated method as claimed in claim 1 wherein when said predetermined embossment style is said horizontal long raised panel design, said selecting operation comprises:

determining said first die set is installed in said embossing press;

disengaging said first die set from a platen of said embossing press; and removing said first die set from said embossing press using a second automated conveyer prior to said installing operation.

6. An automated process as claimed in claim 1 wherein said predetermined embossment style is said vertical raised panel design, and said automated process produces said sheet metal layer exhibiting a finished height of substantially twenty-eight inches.

* * * * *